United States Patent
Kumar et al.

(10) Patent No.: US 8,522,136 B1
(45) Date of Patent: Aug. 27, 2013

(54) EXTENSIBLE MARKUP LANGUAGE (XML) DOCUMENT VALIDATION

(75) Inventors: Arun Kumar, Bangalore (IN); Ramesh Nethi, Bangalore (IN)

(73) Assignee: Sonoa Networks India (Pvt) Ltd., Bangalore (IN)

( * ) Notice: Subject to any disclaimer, the term of this patent is extended or adjusted under 35 U.S.C. 154(b) by 926 days.

(21) Appl. No.: 12/058,759

(22) Filed: Mar. 31, 2008

(51) Int. Cl.
*G06F 7/00* (2006.01)
*G06F 17/30* (2006.01)

(52) U.S. Cl.
USPC .......................... 715/237; 715/234; 715/239

(58) Field of Classification Search
USPC .................................................. 715/237, 234
See application file for complete search history.

(56) References Cited

U.S. PATENT DOCUMENTS

| | | | | |
|---|---|---|---|---|
| 7,467,149 B2 * | 12/2008 | Gaurav et al. | ........................ | 1/1 |
| 7,500,188 B1 * | 3/2009 | Trapani et al. | ................. | 715/273 |
| 7,640,495 B2 * | 12/2009 | Ballinger et al. | ............. | 715/237 |
| 7,865,477 B2 * | 1/2011 | Larcheveque et al. | ........ | 707/687 |
| 7,865,823 B2 * | 1/2011 | Matheson et al. | ............ | 715/237 |
| 7,882,138 B1 * | 2/2011 | Kumar | ........................... | 707/797 |
| 8,055,611 B1 * | 11/2011 | Kumar et al. | .................. | 707/607 |
| 2003/0070142 A1 * | 4/2003 | Drake et al. | .................. | 715/513 |
| 2003/0154444 A1 | 8/2003 | Tozawa | | |
| 2004/0073870 A1 * | 4/2004 | Fuh et al. | ...................... | 715/513 |
| 2005/0039166 A1 * | 2/2005 | Betts et al. | .................... | 717/114 |
| 2005/0055336 A1 * | 3/2005 | Hui et al. | .......................... | 707/3 |
| 2005/0138542 A1 * | 6/2005 | Roe et al. | ....................... | 715/513 |
| 2005/0177543 A1 * | 8/2005 | Chen et al. | ........................ | 707/1 |
| 2005/0177578 A1 * | 8/2005 | Chen et al. | ..................... | 707/100 |
| 2006/0206523 A1 * | 9/2006 | Gaurav et al. | ............. | 707/104.1 |
| 2006/0288021 A1 * | 12/2006 | Kojima | ......................... | 707/100 |
| 2007/0118540 A1 * | 5/2007 | Guo | ............................. | 707/100 |
| 2007/0250766 A1 | 10/2007 | Medi | | |
| 2008/0028374 A1 * | 1/2008 | Matsa et al. | .................. | 717/141 |
| 2008/0028375 A1 * | 1/2008 | Matsa et al. | .................. | 717/141 |
| 2008/0028376 A1 * | 1/2008 | Kostoulas et al. | ............ | 717/143 |
| 2008/0046453 A1 * | 2/2008 | Kostoulas et al. | ............ | 707/101 |
| 2008/0313234 A1 * | 12/2008 | Chen et al. | ................. | 707/104.1 |
| 2010/0228880 A1 * | 9/2010 | Hunt et al. | .................... | 709/246 |

OTHER PUBLICATIONS

JavaScript & DHTML Cookbook: Danny Goodman, pp. 434-436 O'Reilly Media, Inc. Pub. Date: Apr. 21, 2003.*
U.S. Appl. No. 60/418,673 Fuh et al. filed Oct. 15, 2002.*
XML Schema by: Eric van der Vlist Publisher: O'Reilly Media, Inc. Pub. Date: Jun. 25, 2002. (See pp. 89-91).*

* cited by examiner

*Primary Examiner* — William Bashore
*Assistant Examiner* — Nathan Shrewsbury
(74) *Attorney, Agent, or Firm* — Evergreen Valley Law Group, P.C.; Kanika Radhakrishnan

(57) ABSTRACT

XML Document Validation. Structure information of an XML schema is stored in the XML schema node array for structure validation of an XML document. Further, datatype information of the XML schema is stored in the XML schema type node array for datatype validation of the XML schema. The XML schema node array and the XML schema type node array are one-dimensional arrays. The XML document is validated using information stored in the XML schema node array and in the XML schema type node array.

18 Claims, 6 Drawing Sheets

EXTENSIBLE MARKUP LANGUAGE (XML) DOCUMENT VALIDATION

BACKGROUND

1. Technical Field

Embodiments of the invention relate to validating Extensible Markup Language (XML) documents.

2. Prior Art

Hypertext Markup Language (HTML) is a markup language designed for creating web pages with hypertext and other information to be displayed in a web browser. XML is a metalanguage describing structure of data and is not a fixed set of elements like HTML. XML is a general-purpose specification for creating custom markup languages. XML is classified as an extensible language because XML allows users to define their own elements. XML facilitates the sharing of structured data across different information systems, particularly via the Internet. Further, XML is also used for encoding documents and serializing data. Over a period of time, the use of XML as a data exchange format has increased tremendously.

XML schema is a language or a model for describing a structure and constraining the contents of the XML document. The constraints defined for the XML documents follow the basic syntax constraints imposed by XML. An XML schema provides a view of an XML document at a relatively high level of abstraction.

There are languages developed specifically to express XML schemas. The Document Type Definition (DTD) language, which is native to the XML specification, is a schema language that is of relatively limited capability, but has other uses in XML aside from the expression of schemas. Another very popular and more expressive XML schema language is XML Schema standardized by World Wide Web Consortium (W3C). The mechanism for associating an XML document with an XML schema varies according to the schema language. The process of checking to find out if an XML document conforms to an XML schema is called validation. XML Documents are considered valid if the XML documents satisfy the requirements of the XML schema with which they have been associated.

A conventional XML document validation method is explained as follows. An XML document is received by an XML parser. The XML parser parses the XML document to generate Streaming Application Program Interface for XML (SAX) events. An XML schema validator subscribes to the SAX events from the XML parser and determines whether the XML document is in accordance with conditions specified in an XML schema. The XML schema validator uses the XML schema for validation of the XML document.

A format in which XML schema is organized or modeled affects runtime performance of the XML schema validator. Currently available techniques convert XML schema into complex data structures for example, Non-deterministic Finite Automata (NFA), and Deterministic Finite Automata (DFA). These complex data structures affect the runtime performance of the XML schema validator. Further, as the XML schema validator has to deal with the complex data structures there is an inefficient utilization of Central Processing Unit (CPU) time. Moreover, these complex data structures lead to inefficient utilization of memory. In case where the XML schema itself is complex and long, the complexity of the complex data structure worsens and it becomes difficult to read and maintain the complex data structure.

In light of the foregoing discussion, there is a need for an efficient organization of XML schema data structures for XML document validation.

SUMMARY

Embodiments of the invention provide a method, system and a machine-readable medium product for validating an XML document.

An exemplary embodiment of the invention provides a method for validating an XML document. Structure information of an XML schema is stored in an XML schema node array for structure validation of the XML document. In an embodiment of the invention, information about a structure of the XML schema is stored in the XML schema node array. Further, datatype information of the XML schema is stored in an XML schema type node array for datatype validation of the XML document. The XML schema node array and the XML schema type node array include one-dimensional arrays. The XML document is then validated using information stored in the XML schema node array and in the XML schema type node array.

An exemplary embodiment of the invention provides a system for validating an XML document. The system includes an XML schema node array for storing structure information of an XML schema for structure validation of an XML document. The system also includes an XML schema type node array for storing datatype information of the XML schema for datatype validation of the XML document. The XML schema node array and the XML schema type node array include one-dimensional arrays. Further, the system includes an XML schema validator for validating the XML document using information stored in the XML schema node array and the in XML schema type node array.

An exemplary embodiment of the invention provides a machine-readable medium product including instructions operable to cause a programmable processor to perform validating an XML document. The machine-readable medium product includes instructions operable to cause a programmable processor to perform storing structure information of an XML schema in an XML schema node array for structure validation of the XML document, storing datatype information of the XML schema in an XML schema type node array for datatype validation of the XML document, and validating the XML document using information stored in the XML schema node array and in the XML schema type node array.

DETAILED DESCRIPTION OF THE EMBODIMENTS

Figure 1:
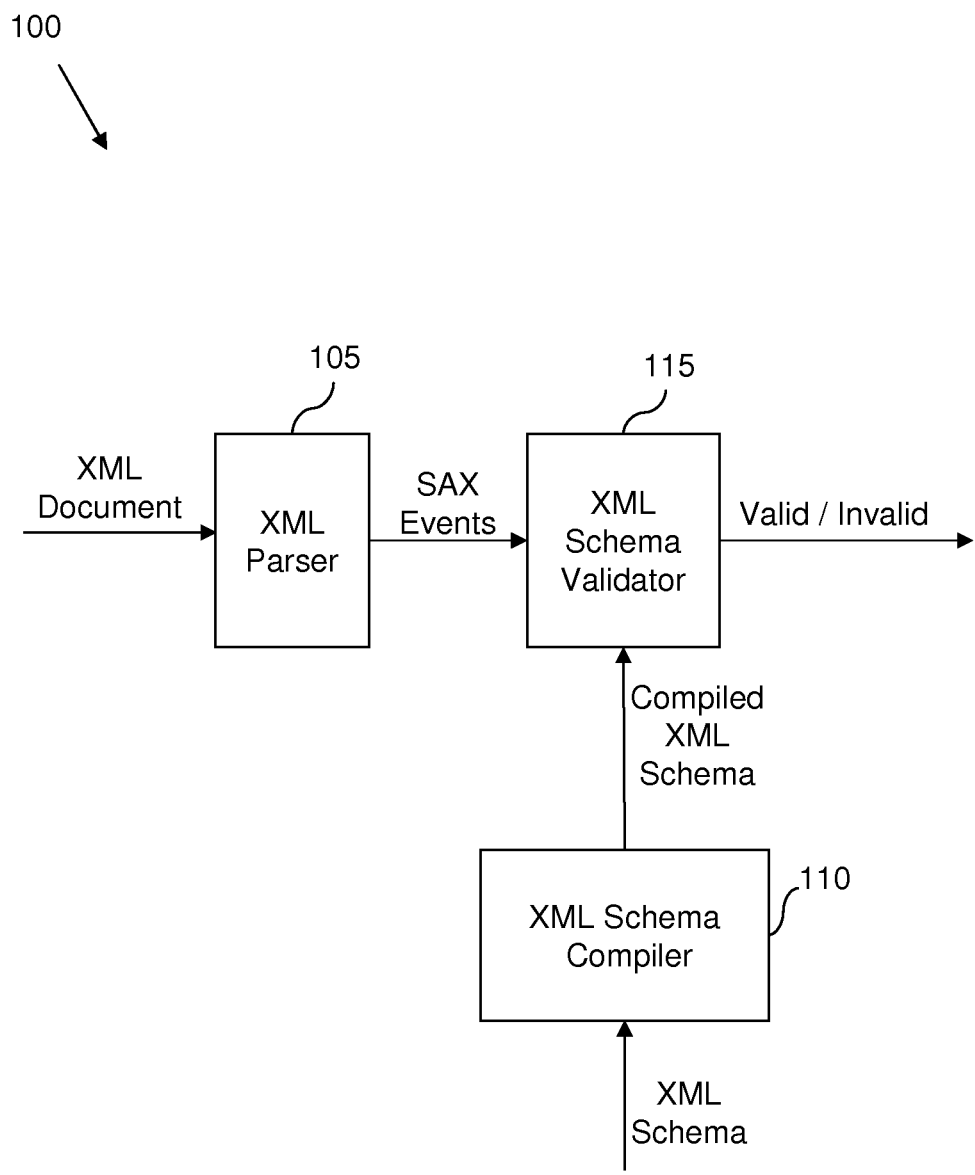
FIG. 1 is a block diagram of an environment according to an embodiment of the invention.

FIG. 1 is a block diagram of an environment 100 according to an embodiment of the invention. Environment 100 includes an XML parser 105 for parsing an XML document, an XML schema compiler 110 for compiling XML schema and an XML schema validator 115 for validating the XML document according to the XML schema. In an embodiment of the invention, XML parser 105 receives several online streams of XML documents. XML parser 105 may include an application program interface (API), for example, Simple API for XML (SAX), for parsing the XML document. XML parser 105 parses an XML document to create SAX events.

Further, XML schema compiler 110 receives an XML schema and compiles the XML schema. The compiled XML schema is fed into the XML schema validator 115. In an embodiment of the invention, the XML schema is compiled to linear one-dimensional arrays.

XML schema validator 115 subscribes to a SAX event from the XML parser 105 and validates a portion of the XML document. Examples of the portion of the XML document include but are not limited to, an XML element included in the XML document, a sub-element of the XML element, an attribute of the XML element or XML entities. XML schema validator 115 validates the portion of the XML document by determining whether the portion conforms to definition and constraints specified in the compiled XML schema or specified in a part of the compiled XML schema.

An exemplary XML schema and the compiled XML schema including the linear one-dimensional arrays are shown below.

Exemplary XML Schema

```
<xs:schema xmlns:xs="http://www.w3.org/2001/XMLSchema">
  <xs:element name="books">
    <xs:complexType>
      <xs:sequence>
        <xs:element name="book" minOccurs="0" maxOccurs=
            "unbounded">
          <xs:complexType>
            <xs:sequence>
              <xs:element name="isbn" minOccurs="1" maxOccurs=
                  "1">
                <xs:simpleType>
                  <xs:restriction base="xs:string">
                    <xs:length value="13"/>
                    <xs:pattern value="\d{13}"/>
                  </xs:restriction>
                </xs:simpleType>
              </xs:element>
              <xs:element name="title" minOccurs="1" maxOccurs="1"
                  type="xs:string"/>
              <xs:element name="price" minOccurs="1" maxOccurs=
                  "1">
                <xs:simpleType>
                  <xs:restriction base="xs:decimal">
                    <xs:fractionDigits value="2"/>
                  </xs:restriction>
                </xs:simpleType>
              </xs:element>
            </xs:sequence>
          </xs:complexType>
        </xs:element>
      </xs:sequence>
    </xs:complexType>
  </xs:element>
</xs:schema>
```

Compiled XML Schema

Schema NodeIdx:1 MinOccurs:0 MaxOccurs:0 FirstChildIdx:2 ChildCount:2
Choice NodeIdx:2 MinOccurs:1 MaxOccurs:1 FirstChildIdx:12 ChildCount:1
RefNode NodeIdx:12 MinOccurs:1 MaxOccurs:1 FirstChildIdx:3 ChildCount:1
Element NodeIdx:3 Flags:9 books MinOccurs:1 MaxOccurs:1 FirstChildIdx:4 ChildCount:1
ComplexType NodeIdx:4 Flags:9 MinOccurs:-2 MaxOccurs:-2 FirstChildIdx:5 ChildCount:1
Sequence NodeIdx:5 Flags:8 MinOccurs:0 MaxOccurs:1 FirstChildIdx:6 ChildCount:1
Element NodeIdx:6 Flags:1 book MinOccurs:0 MaxOccurs:-1 FirstChildIdx:7 ChildCount:1
ComplexType NodeIdx:7 Flags:1 MinOccurs:1 MaxOccurs:-2 FirstChildIdx:8 ChildCount:1
Sequence NodeIdx:8 MinOccurs:1 MaxOccurs:1 FirstChildIdx:9 ChildCount:3
Element NodeIdx:9 isbn Type:1 MinOccurs:1 MaxOccurs:1
Element NodeIdx:10 title Type:-18 MinOccurs:1 MaxOccurs:1
Element NodeIdx:11 price Type:2 MinOccurs:1 MaxOccurs:1
Type:1 BaseType: -18 TopBaseType: -18 Flags:0x1000100 Length:13 Pattern:1
Type:2 BaseType:-9 TopBaseType:-9 Flags:0x1000010 FractionDigits:2

Figure 2:
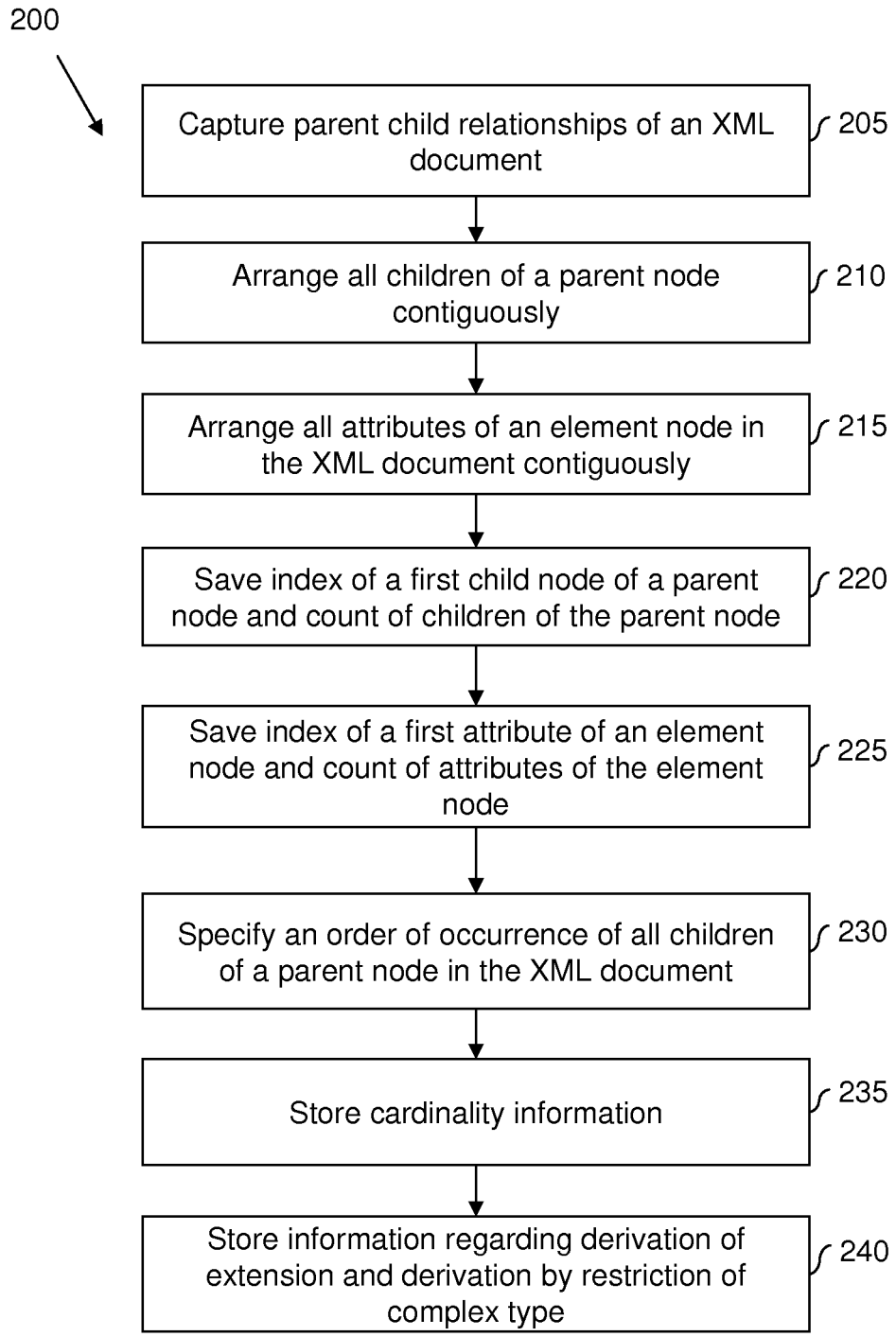
FIG. 2 is a flow diagram illustrating steps performed in a method for storing structure information of an XML schema according to an embodiment of the invention.

FIG. 2 is a flow diagram illustrating steps performed in a method 200 for storing structure information in an XML schema node array to facilitate structure validation of an XML document according to an embodiment of the invention.

Structure information of an XML schema is stored in the XML schema node array. In an embodiment of the invention, information about a structure of the XML schema is stored in the XML schema node array. Further, the information stored in the XML schema node array is used for structure validation of an XML document. At step 205, parent child relationships of an XML document are captured. A parent node in the XML document may include one or more children. The relationship between the parent node and the one or more children corresponding to the parent node is specified in the XML schema. The corresponding information is stored in the XML schema node array. In an embodiment of the invention, each parent node may include a number of children greater than the number of children specified in the XML schema.

After capturing the parent child relationships of the XML document, at step 210, all children of a parent node are arranged contiguously. In an embodiment of the invention, all children of the parent node can appear anywhere in the XML schema node array provided all the children are arranged contiguously. Further at step 215, all attributes of an element node of the XML document are arranged contiguously. Attributes are used to add information to an element node of the XML document. Further, attributes are used to define properties that are not considered as content of the element node. A plurality of attributes may be defined for each element node of the XML document. All the attributes defined are stored randomly in the XML schema node array provided the attributes are arranged contiguously.

At step 220, an index of a first child node of a parent node and count of children of the parent node are stored in the XML schema node array. Since all children of the parent node are arranged in a contiguous manner in the XML schema node array, storing the index of the first child node and the count of children of the parent node facilitates faster identification of all the children. In an embodiment of the invention, the number of children of each parent node is fixed. In an embodiment of the invention, an index of a first child node of a parent node and an index of a last child node of the parent may also be stored. Similarly, at step 225, an index of a first attribute of an element node and count of attributes of the element node are stored in the XML schema node array. In an embodiment of the invention, an index of a first attribute of an element node and an index of a last attribute of the element node may also be stored.

Further at step 230, an order of occurrence of all children of a parent node of the XML document is stored in the XML schema node array. In an embodiment of the invention, order can be defined as of choice type or of sequence type. If the order is defined as a choice type in the XML schema, then any one child of a set of children of a particular parent node specified in the XML schema can appear in the XML document. Alternatively, if the order is defined as a sequence type in the XML schema, then all the children of a particular parent node defined in a sequence in the XML schema should appear in the same sequence in the XML document. For example, consider a parent node "book". The order of occurrence of the children of the parent node "book" may be defined as a choice type. The XML schema may specify "author", "publication" and "price" as the children of the parent node "book". Since the order is defined as a choice type, any one of the children ("author" or "publication" or "price") may appear in the XML document. In the alternative case, the XML schema may specify the children of the parent node "book" as a sequence type. For example, consider the sequence of children of the parent node "book" specified by the XML schema as "publication", "price" and "author". In the XML document the children of the parent node "book" required in the same sequence "publication", "price" and "author".

Further, at step 235, cardinality information of the XML schema is stored in the XML schema node array. The cardinality information includes information of maximum and minimum number of occurrences of the XML schema nodes in the XML schema node array. In an embodiment of the invention, a maximum and minimum number of occurrences may be specified for all children of a parent node. In another embodiment of the invention, maximum and minimum number of occurrences may be specified for all element nodes of the XML document.

At step 240, information regarding derivation by extension and derivation by restriction of complex type is stored in the XML schema node array. A complex type in an XML schema may be a collection of related elements of the XML document. The complex type defines constraints of the XML language. In an embodiment of the invention, a complex type may be defined for sub-elements of the XML document.

In an embodiment of the invention, extension of complex types includes creating a derived complex type. Further, derivation by extension includes adding one or more attributes to a base type of an element which is required to be extended. Alternatively, derivation by restriction includes removal of one or more attributes from the base type of the element which is required to be restricted. For example, consider a base type element "address" specified in the XML schema. One or more attributes can be added to the base type element. For example, the address may be specified as "US address" or "UK address", wherein more detail is added to the base type element "address". Similarly, one or more attributes may be removed from the base type element "address". In an embodiment of the invention, for validating the XML document according to derivation by extension and derivation by restriction, it is essential to find out the origin of the derived or the restricted type. The XML document is considered to be valid if the origin of the derived or the restricted type matches with the base element specified in the XML schema.

In an embodiment of the invention, the XML schema node array may include indices to one or more arrays. Examples of the one or more arrays include but are not limited to XML schema type node array and Namespace URI (Uniform Resource Identifier) array.

In an embodiment of the invention, steps 205 to 240 may be performed in a random order and not necessarily in the order specified by FIG. 2.

Figure 3:
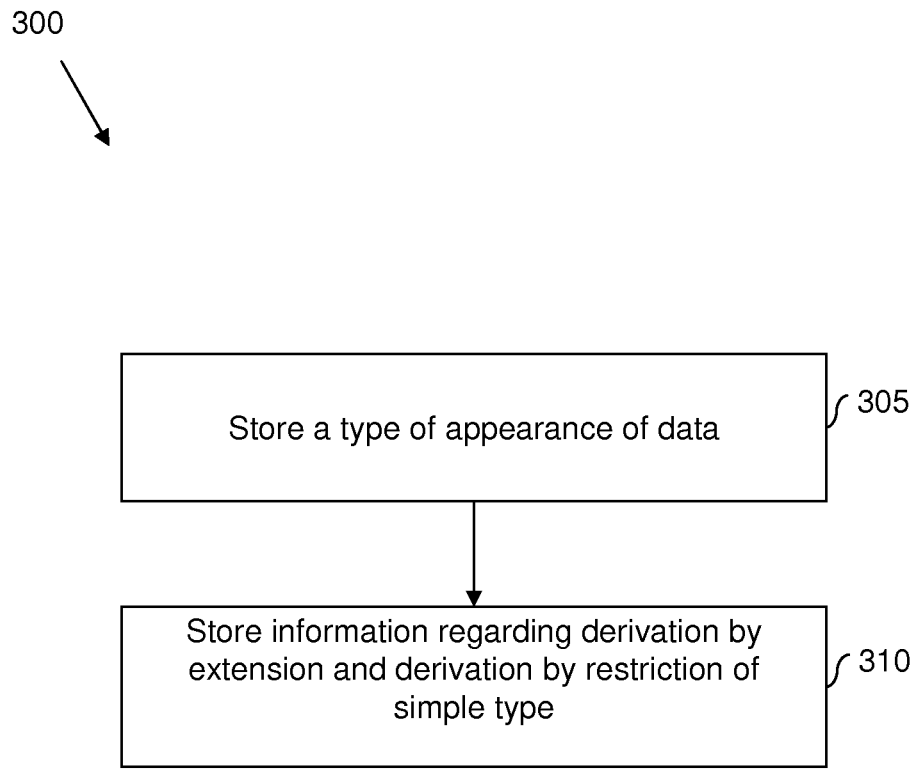
FIG. 3 is a flow diagram illustrating steps performed in a method for storing datatype information of an XML schema according to an embodiment of the invention.
Figure 4:
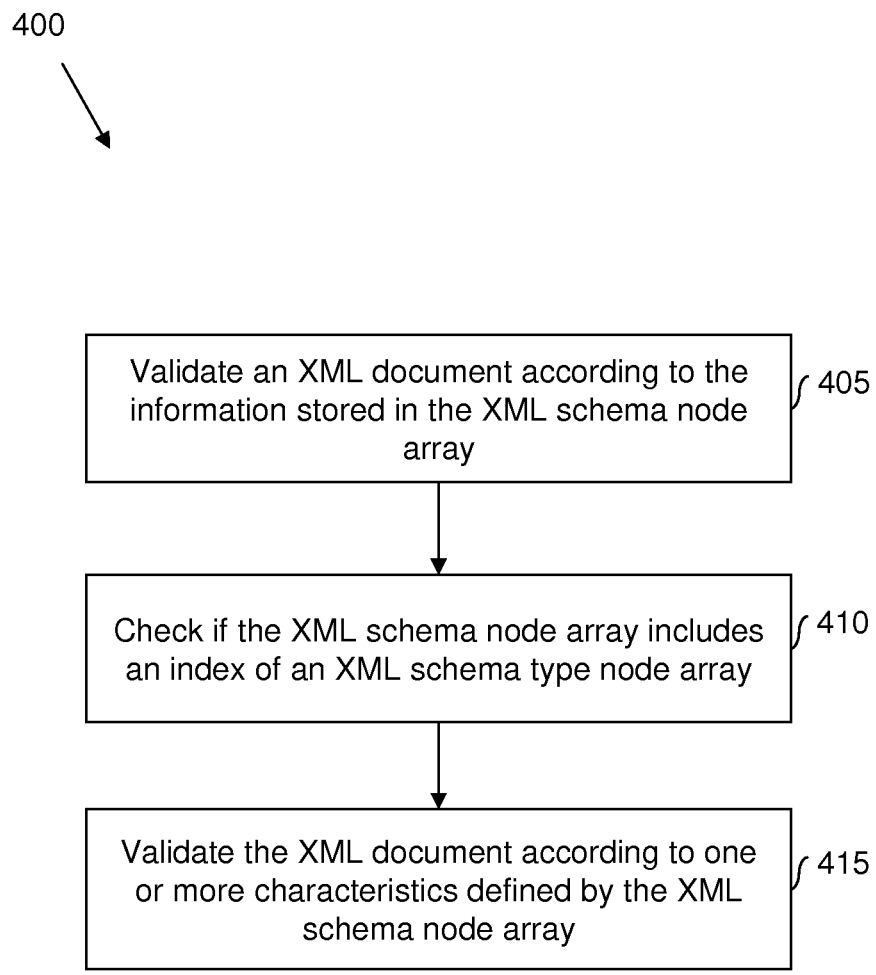
FIG. 4 is a flow diagram illustrating steps performed in a method for validating an XML document according to an embodiment of the invention.

In general, FIG. 2 illustrates the steps in a method for structure validation and FIG. 3 illustrates a method for datatype validation of an XML document according to various embodiments of the invention. FIG. 4 illustrates how an XML document is validated using the methods of FIG. 2 and FIG. 3.

FIG. 3 is a flow diagram illustrating steps performed in a method 300 for storing datatype information in an XML schema type node array to facilitate datatype validation of an XML document according to an embodiment of the invention.

Datatype information of an XML schema is stored in the XML schema type node array. The information stored is later used for datatype validation of the XML document. At step 305, a type of appearance of data is stored in the XML schema type node array. For example, consider a node "date". "Date" may be defined as a string type node or as an integer type node. In an embodiment of the invention a type of appearance may not be specified for all nodes of the XML document. In another embodiment of the invention, a value range may also be stored in the XML schema type node array. For example, consider a node "price". A value range may be specified for the node "price" as 10 to 100. Therefore, only values between 10 and 100 are accepted and any other value for the node "price" would be rejected.

Further at step 310, information regarding derivation by extension and derivation by restriction of simple type is stored in the XML schema type node array. In an embodiment of the invention, simple type includes only character data. Generally, attributes are not defined for simple type. Derivation by extension for simple type includes adding data values to the original datatype. Further, derivation by restriction for simple type includes adding constraints while maintaining the semantic and meaning of the original datatype. For example, consider a data value specified for node "length" as 10. The data value can be increased to 20 which indicates that the data value has been extended. Similarly, constraints may be added to restrict the datatype. For example, if a value range for price is specified as 10 to 100. Constraints may be added by restricting the value range from 10 to 100 to 10 to 50.

In an embodiment of the invention, every node in the XML schema type node array includes an index of the corresponding parent node. Including an index of the corresponding parent node for each node in the XML schema type node array provides a derivation hierarchy. This derivation hierarchy provides additional information for datatype validation. For example, a parent node may include additional constraints. The additional constraints extracted from the derivation hierarchy are then applied on the XML document for datatype validation. In an embodiment of the invention, the constraints may include but are not limited to pattern, value range, data values including enumeration, fixed values and default values and regex (regular expression). In another embodiment of the invention, the XML schema type node array may include indices to additional arrays for datatype validation. Examples of additional arrays for datatype validation may include but are not limited to pattern array, array for compiled regex (regular expression) patterns and an array of data values including enumeration, fixed values and default values.

FIG. 4 is a flow diagram illustrating steps performed in a method 400 for validating an XML document using information stored in the XML schema node array and in the XML schema type node array according to an embodiment of the invention.

Information stored in the XML schema node array and the XML schema type node array is used for validating the XML document. At step 405, an XML document is validated according to the information stored in the XML schema node array. Validation of the XML document using the XML schema node array is explained in the following paragraphs.

Parent child relationships stored in the XML schema node array are checked for each parent node during validation. Further, cardinality information is checked by comparing the cardinality information stored in the XML schema node array with the information stored in the runtime counters as the EndOfElement (EOE) of the XML document is reached. As explained earlier, cardinality information includes information of a maximum and minimum number of appearances of every node in the XML schema node array. For example, consider a node "book" as a parent node. Consider a child node corresponding to "book" to be "author". Maximum and minimum number of appearances for "author" may be (1, 1) respectively. Cardinality counter (1, 1) indicates that "author" can occur only once for the XML document to be validated successfully. The cardinality information stored in the XML schema node array is then compared with the runtime counters as the EndOfElement (EOE) denoted by "/book" is reached.

Further, the XML document is validated based on an order of occurrence. As explained in FIG. 3, the order can be of choice type or of sequence type. This information is checked during runtime for structure validation of the XML document. The information regarding derivation by extension and derivation by restriction stored in the XML schema node array is also verified for validating the XML document.

In an embodiment of the invention, the XML schema node array may include an index to Namespace URI (Uniform Resource Identifier) array for checking a namespace of each element and attributes of the XML document. In an embodiment of the invention, the namespace of the element is checked at StartOfElement (SOE) for each element of the XML document.

After validating the XML document using the information stored in the XML schema node array, at step 410, the XML schema node array is checked to find out if there is an index to XML schema type node array. In an embodiment of the invention, the XML schema node array includes an index to the XML schema type node array if a datatype of a particular node has to be validated. In another embodiment of the invention, if a datatype of a particular node in the XML document is not required to be validated, then the index value corresponding to the XML schema type node array in the XML schema node array may be "−1".

If the schema node array includes an index of the XML schema type node array, at step 415, the XML document is validated according to one or more characteristics defined by the XML schema type node array. As explained in FIG. 3, the information stored in the XML schema type node array is checked for datatype validation of the XML document. In an embodiment of the invention, datatype validation ensures that the data included in the attribute values and text nodes of the elements of the XML document are of proper datatype within a range specified by the XML schema.

Further, the XML document is considered to be valid if the XML document adheres to the structure information stored in the XML schema node array and datatype information stored in the XML schema type node array.

Therefore, embodiments of the invention facilitate XML document validation by optimizing the available memory space. The XML schema is compiled and reduced to linear one-dimensional arrays that are easily available for validation during runtime, thereby improving the memory utility. Further, the runtime performance is also optimized.

Figure 5:
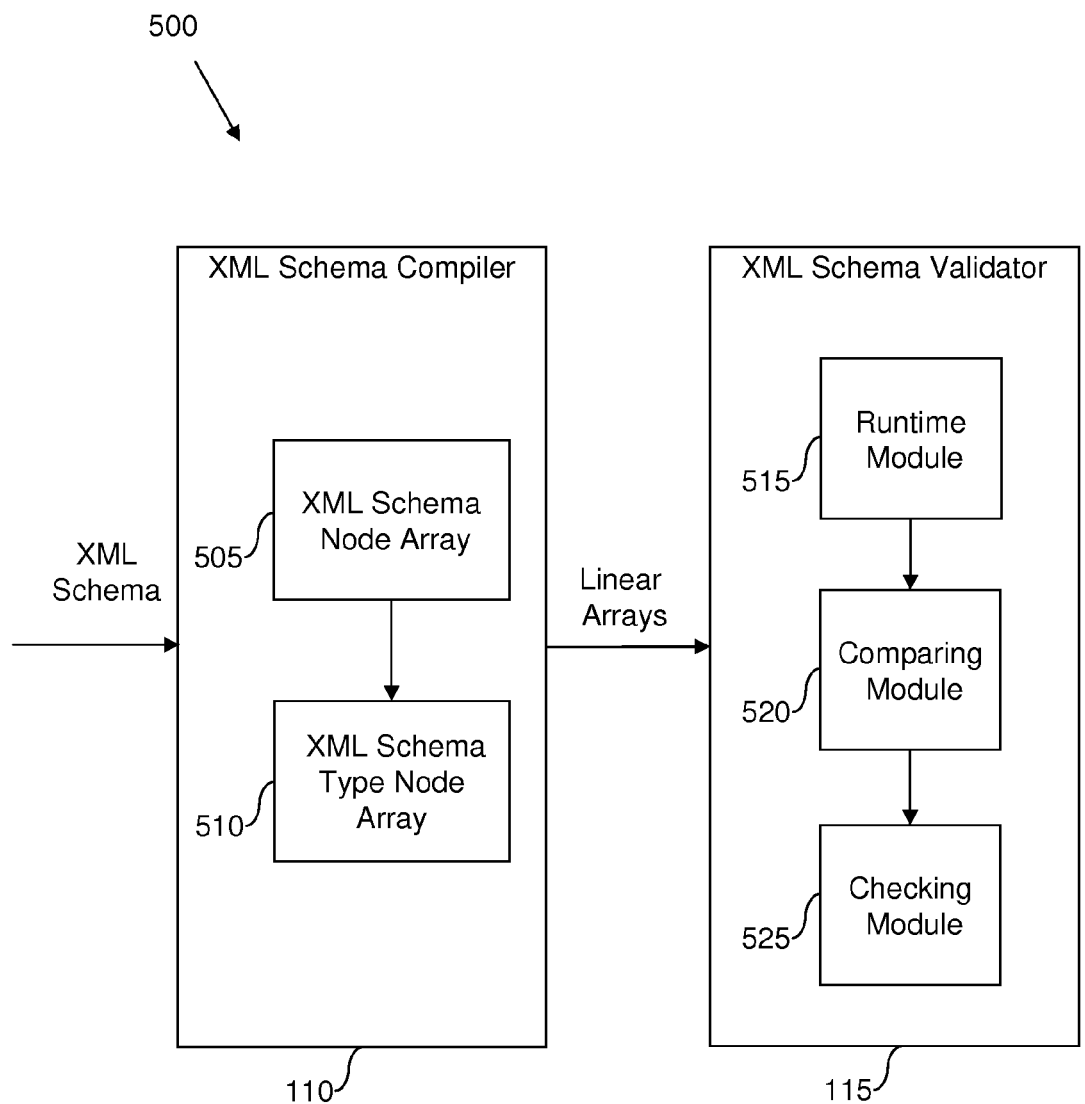
FIG. 5 is a block diagram illustrating a system for validating the XML document according to an embodiment of the invention.

FIG. 5 is a block diagram illustrating a system 500 for validating an XML document according to an embodiment of the invention.

System 500 includes an XML schema compiler 110 for compiling XML schema. System 500 also includes an XML schema validator 115 for validating the XML document. XML schema compiler 110 includes one or more arrays for storing information including an XML schema node array 505 and an XML schema type node array 510. XML schema validator 110 includes one or more modules for validating the XML document including runtime module 515, comparing module 520 and checking module 525.

XML schema compiler 110 receives XML schema and compiles the XML schema. In an embodiment of the invention, XML schema node array 505 and XML schema type node array 510 represent the compiled format of the XML schema. Further, information stored in the XML schema node array 505 and in the XML schema type node array 510 is used for validating the XML document.

XML schema node array 505 stores structure information to facilitate structure validation of the XML document. In an embodiment of the invention, XML schema node array 505 is a linear one-dimensional array. In another embodiment of the invention, XML schema node array stores information about a structure of the XML schema. Further, parent child relationships of the XML document are captured. XML schema node array 505 then stores the parent child relationships. Further, XML schema node array 505 stores a contiguous structure of all children of a parent node of the XML document. Similarly, XML schema node array 505 also stores a contiguous structure of all attributes of an element node of the XML document. The XML schema node array 505 stores an index of a first child node of the parent node and count of children of the parent node. Similarly, XML schema node array 505 also stores an index of a first attribute of the element node and the count of attributes of the element node.

Further XML schema node array 505 stores cardinality information. The cardinality information includes information of a maximum and minimum number of occurrences of XML schema nodes of XML schema. In an embodiment of the invention, a set of cardinality counters corresponding to each child node of the parent may be stored in the XML schema node array 505. Further, an order of occurrence of all children of the parent node may be specified. XML schema node array 505 then stores the order.

XML schema node array 505 also stores information regarding derivation by extension and derivation by restriction of complex type of the XML schema. In an embodiment of the invention, XML schema node array 505 may include an index of XML schema type node array 510 if a datatype of a particular node has to be validated. In another embodiment of the invention, XML schema node array 505 may include an index of a Namespace URI array (not shown in FIG. 3) for checking the name of each element of the XML document. In yet another embodiment of the invention XML schema node array 505 may include indices to one or more arrays depending on the definition of the XML schema to facilitate structure validation of the XML document.

XML schema type node array 510 stores datatype information to facilitate datatype validation of the XML document. In an embodiment of the invention, XML schema type node array 510 is a linear one-dimensional array. XML schema type node array 510 stores a type of occurrence of data of a particular node of XML schema. XML schema type node array 510 stores information regarding derivation by extension and derivation by restriction of simple type of the XML schema. In an embodiment of the invention, datatype of a particular node is validated if XML schema node array 505 includes an index of XML schema type node array 510. In another embodiment of the invention, XML schema type node array 510 may include indices to one or more arrays for validating the datatype. Examples of the one or more arrays include but are not limited to pattern array, array for compiled regex (regular expression) patterns and an array of data values including enumeration, fixed values and default values.

XML schema validator 115 is used for validating the XML document using information stored in the XML schema node array 505 and in the XML schema type node array 510. XML schema validator 115 performs structure validation by checking whether the structure information stored in XML schema node array 505 matches with the structure of the XML document.

In an embodiment of the invention, runtime module 515 stores runtime information. The runtime information includes information regarding all XML nodes of the XML document. In another embodiment of the invention, runtime module 515 may include one or more runtime data structures stored in a stack in a runtime engine (not shown in FIG. 5). Further, runtime module 515 includes information of a number of occurrences of each XML node of the XML document. In an embodiment of the invention, the number of occurrences of each XML node may include a maximum and minimum number of occurrences. Comparing module 520 compares the cardinality information stored in XML schema node array 505 with runtime information stored in runtime module 515 to facilitate structure validation of the XML document.

Once the XML document is validated using the XML schema node array 505, checking module 525 performs a check to find out if XML schema node array 505 includes an index of XML schema type node array 510. If XML schema node array 505 includes an index of XML schema type node array 510, datatype validation of the XML document is performed. In an embodiment of the invention, one or more characteristics specified by XML schema type node array 510 are checked to facilitate datatype validation. If the XML document adheres to the information stored in the XML schema node array 505 and XML schema type node array 510, the XML document is declared valid else the XML document is declared invalid.

In an embodiment of the invention, XML schema compiler 110 and XML schema validator 115 may include one or more algorithms to perform respective functions.

One or more steps of the method illustrated in FIGS. 2, 3 and 4 may be implemented using a computer system. An exemplary computer system is explained in details in conjunction with FIG. 6.

Figure 6:
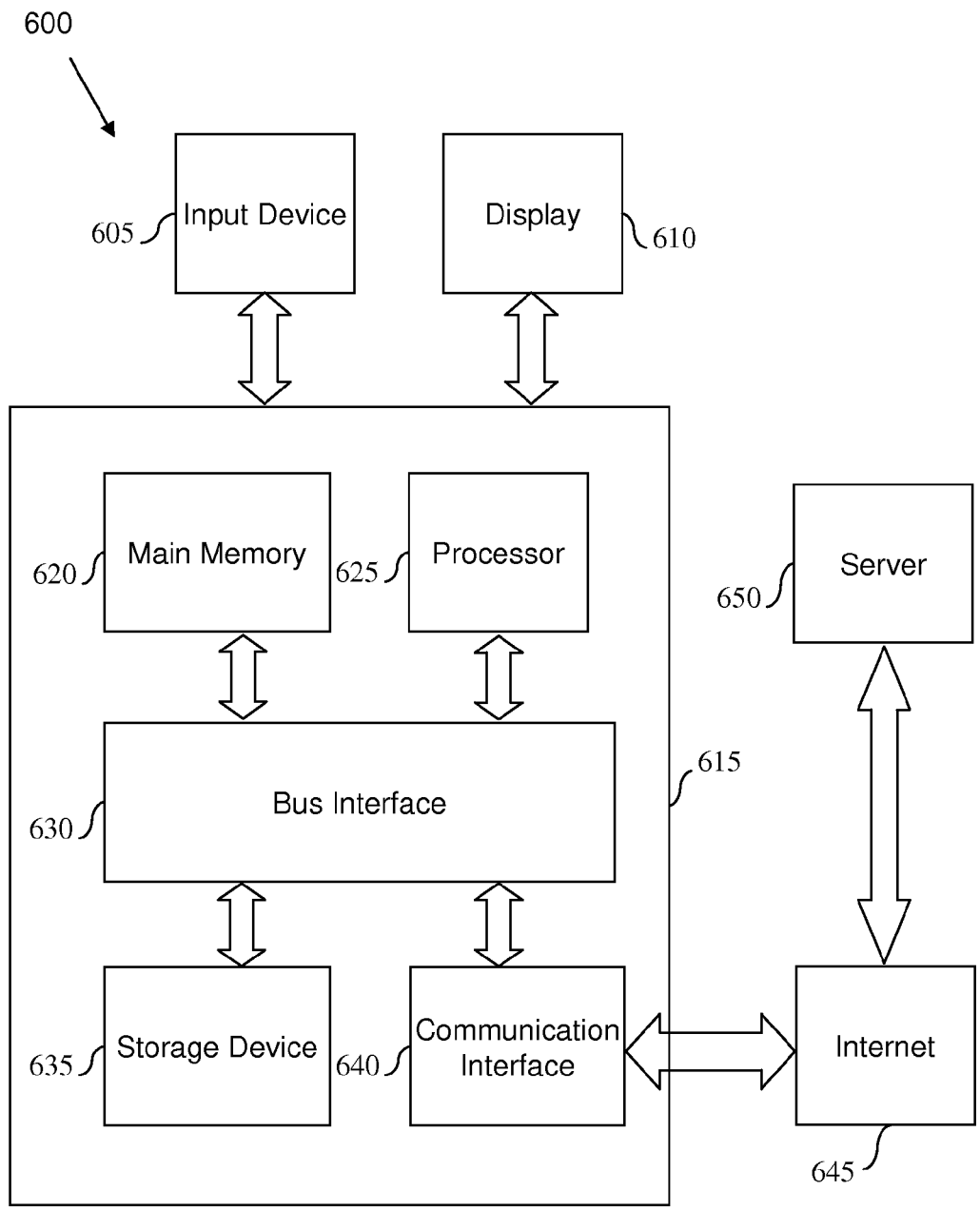
FIG. 6 is a block diagram of an exemplary computer system upon which various embodiments of the invention may be implemented.

FIG. 6 is a block diagram of an exemplary computer system 600 upon which various embodiments of the invention may be implemented. Computer system 600 includes a processing unit 615 including a main memory 620, such as a Random Access Memory (RAM) or other dynamic storage device, coupled to a bus interface 630 for storing information and instructions to be executed by processor 625. A storage device 635, such as a magnetic disk or optical disk, is provided and coupled to bus interface 630 for storing information and instructions. Computer system 600 may be coupled via bus interface 630 to a display 610 for displaying information to a user. An input device 605, including alphanumeric and other keys, is coupled to bus interface 630 for communicating information and command selections to processor 625.

Embodiments of the invention are related to the use of computer system 600 for implementing the techniques described herein. In an embodiment of the invention, those techniques are performed by computer system 600 in response to processor 625 executing one or more sequences of one or more instructions included in main memory 620. Such instructions may be read into main memory 620 from another machine-readable medium product, such as storage device 635. Execution of the sequences of instructions included in main memory 620 causes processor 625 to perform the method embodiment of the invention described herein. In alternative embodiments, hard-wired circuitry may be used in place of or in combination with software instructions to implement the invention. Thus, embodiments of the invention are not limited to any specific combination of hardware circuitry and software.

The term "machine-readable medium product" as used herein refers to any medium that participates in providing data that causes a machine to operation in a specific fashion. Examples of the machine-readable medium product include but are not limited to memory devices, tapes, disks, cassettes, integrated circuits, servers, online software, download links, installation links, and online links.

In an embodiment implemented using computer system 600, various machine-readable medium products are involved, for example, in providing instructions to processor 625 for execution. Computer system 600 also includes a communication interface 640 coupled to bus interface 630. Communication interface 640 provides a two-way data communication coupling to internet 645 that is coupled a server 650. Server 650 might transmit a requested code for an application program through internet 645 and communication interface 640.

The foregoing description sets forth numerous specific details to convey a thorough understanding of embodiments of the invention. However, it will be apparent to one skilled in the art that embodiments of the invention may be practiced without these specific details. Some well-known features are not described in detail in order to avoid obscuring the invention. Other variations and embodiments are possible in light of above teachings, and it is thus intended that the scope of invention not be limited by this Detailed Description, but only by the following Claims.

What is claimed is:

1. A method for validating an XML document, the method comprising:

storing, by a computer, structure information of an XML schema in an XML schema node array for structure validation of the XML document, wherein the XML schema node array is a one-dimensional array of parent and child nodes arranged in a contiguous manner, wherein storing the structure information in the XML schema node array comprises:

capturing parent child relationships of XML nodes in the XML document;

arranging children of a parent node of the XML document contiguously;

arranging attributes of an element node of the XML document contiguously;

saving index of a first child node of the parent node and count of children of the parent node; and
saving index of a first attribute of an element node and count of attributes of the element node;
storing datatype and value range information of the XML schema and a derivation hierarchy in an XML schema type node array for datatype validation of the XML document, wherein the XML schema type node array is a one-dimensional array, and wherein an index of a parent node stored for each child node in the XML schema type node array provides the derivation hierarchy, the parent node providing additional information for datatype validation of each child node, and wherein information is stored concerning derivation by extension that adds data values to an original datatype and derivation by restriction that adds constraints while maintaining a semantic and meaning of the original datatype; and
validating the XML document using information stored in the XML schema node array and in the XML schema type node array.

2. The method of claim 1 further comprising:
storing cardinality information of the XML schema in the XML schema node array, wherein the cardinality information comprises information of number of occurrences of XML schema nodes of the XML schema.

3. The method of claim 1, wherein the number of occurrences of the XML schema nodes comprises a maximum and minimum number of occurrences of the XML schema nodes.

4. The method of claim 1, wherein validating the XML document comprises:
validating the XML document according to the information stored in the XML schema node array;
checking if the XML schema node array comprises an index of an XML schema type node array; and
validating the XML document according to one or more characteristics defined by the XML schema type node array based on the checking.

5. The method of claim 4, wherein validating the XML document according to the information stored in the XML schema node array further comprises:
comparing the cardinality information with a runtime information of the XML document.

6. The method of claim 1, wherein storing structure information in the XML schema node array comprises:
specifying an order of occurrence of all the children of the parent node of the XML document.

7. A system, at least partially implemented in hardware, comprising:
an XML schema node array for storing structure information of an XML schema for structure validation of an XML document, wherein the XML schema node array is a one-dimensional array of parent and child nodes arranged in a contiguous manner;
an XML schema type node array for storing datatype and value range information of the XML schema and a derivation hierarchy for datatype validation of the XML document, wherein the XML schema type node array is a one-dimensional array, and wherein a parent node stored for each child node in the XML schema type node array provides the derivation hierarchy, the parent node providing additional information for datatype validation of each child node, and wherein information is stored concerning derivation by extension that adds data values to an original datatype and derivation by restriction that adds constraints while maintaining a semantic and meaning of the original datatype; and
an XML schema validator for validating the XML document using information stored in the XML schema node array and in the XML schema type node array.

8. The system of claim 7, wherein the XML schema node array stores cardinality information of the XML schema.

9. The system of claim 8, wherein the cardinality information comprises information of number of occurrences of XML schema nodes of the XML schema.

10. The system of claim 8, wherein the XML schema node array specifies an order of occurrence of all children of a parent node of the XML document.

11. The system of claim 7, wherein the XML schema validator comprises:
a runtime module for storing runtime information, wherein the runtime information comprises information regarding all XML nodes of the XML document;
a checking module for checking if the XML schema node array comprises an index of an XML schema type node; and
a comparing module for comparing the cardinality information stored in the XML schema node array, with runtime information stored in the runtime module.

12. A non-transitory machine-readable medium product comprising instructions operable to cause a programmable processor to perform validating an XML document comprising:
storing, by a computer, structure information of an XML schema in an XML schema node array for structure validation of the XML document, wherein the XML schema node array is a one-dimensional array of parent and child nodes arranged in a contiguous manner;
storing datatype and value range information of the XML schema and a derivation hierarchy in an XML schema type node array for datatype validation of the XML document, wherein the XML schema type node array is a one-dimensional array, and wherein an index of a parent node stored for each child node in the XML schema type node array provides the derivation hierarchy, the parent node providing additional information for datatype validation of each child node, and wherein information is stored concerning derivation by extension that adds data values to an original datatype and derivation by restriction that adds constraints while maintaining a semantic and meaning of the original datatype; and
validating the XML document using information stored in the XML schema node array and in the XML schema type node array.

13. The machine-readable medium product of claim 12 further comprising:
storing cardinality information of the XML schema in the XML schema node array, wherein the cardinality information comprises information of number of occurrences of XML nodes of the XML schema.

14. The machine-readable medium product of claim 13, wherein the number of occurrences of the XML nodes comprises a maximum and minimum number of occurrences of the XML nodes.

15. The machine-readable medium product of claim 12, wherein validating the XML document comprises:
validating the XML document according to the information stored in the XML schema node array;
checking if the XML schema node array comprises an index of an XML schema type node array; and
validating the XML document according to one or more characteristics defined by the XML schema type node array based on the checking.

16. The machine-readable medium product of claim 12, wherein storing structure information in the XML schema node array comprises:
- capturing parent child relationships of XML nodes in the XML document;
- arranging all children of a parent node of the XML document contiguously;
- arranging all attributes of an element node of the XML document contiguously;
- saving index of a first child node of the parent node and count of children of the parent node; and
- saving index of a first attribute of an element node and count of attributes of the element node.

17. The method of claim 1, wherein the parent node comprises at least one additional constraint selected from the group containing pattern, value range, data values including enumeration, fixed values, default values, and regex, and wherein validating the XML document comprises validating the XML documents using the at least one additional constraint derived from the derivation hierarchy.

18. The method of claim 1, wherein the information concerning derivation by extension and derivation by restriction is of a complex type.

* * * * *